Nov. 25, 1969  W. J. LICHTENBERGER  3,479,991
ANIMAL CLIMBING STRUCTURE
Filed July 10, 1968
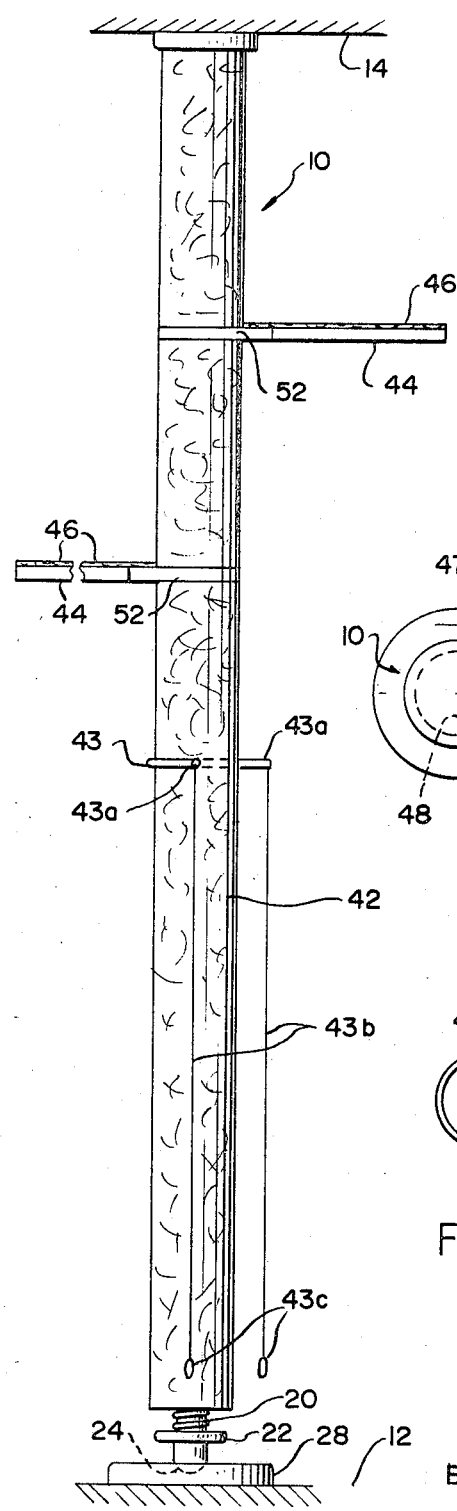
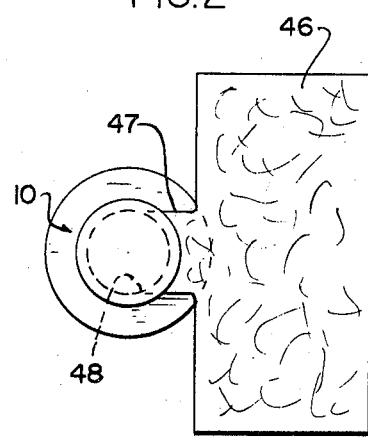
INVENTOR.
WILLIAM J. LICHTENBERGER
BY Hofgren, Wegner, Allen, Stellman & McCord
ATTORNEYS.

United States Patent Office 3,479,991
Patented Nov. 25, 1969

3,479,991
ANIMAL CLIMBING STRUCTURE
William J. Lichtenberger, 10195 W. Higgins Road,
Rosemont, Ill. 60018
Filed July 10, 1968, Ser. No. 743,692
Int. Cl. A01k 1/00, 29/00; A63b 9/00
U.S. Cl. 119—1
12 Claims

ABSTRACT OF THE DISCLOSURE

A portable animal climbing structure having a base and an upright member, characterized in that the upright member is provided with a traction giving animal claw receiving and supporting surface and further characterized in that an animal perching surface is provided intermediate the ends thereof. The upper and lower end portions of the support are provided with a structure for engaging the floor and ceiling of a room to mount the support therebetween.

BACKGROUND OF THE INVENTION

Field of the invention

This invention relates to pet appliances and, more particularly, to an animal climbing and perching structure.

Description of the prior art

In the prior art there are known pole-like structures for supporting appliances such as lamps or the like. An example of such structures includes the Stiffel Patent 2,942,829 and Hargey Patent 1,382,505. In addition, there are known pole-like pet appliances such as the cat's claw filing post shown in Bryson Patent 2,997,019. It is common knowledge that many household pets, particularly cats, have a desire to climb and to perch on elevated or suspended structures. Typically the tendency to satisfy this desire results in the animal climbing items of furniture or drapery, thereby damaging the same, or knocking decorative items from adjacent shelves or the like. Thus, it has become desirable to provide a pole-like structure suitable for climbing by household pets and further desirable to provide such a structure with a perch-like area so that the animal may perch thereupon.

SUMMARY OF THE INVENTION

This invention is directed, in brief, to the provision of an animal climbing structure preferably of a portable nature and for use in a household environment. The best mode currently contemplated by me for carrying out the invention includes the provision of a main tubular member having a base adapted to rest upon the floor and a cap adapted to be juxtaposed against the ceiling. Adjustable screw structure in one of the base ends or caps permits the pole to be fastened in a tensioned condition between the ceiling and the floor. Preferably a shelf-like structure is provided intermediate the ends of the pole to provide a perch for an animal who has gained access thereto by climbing the pole. The exterior of the pole is enclosed with a suitable traction giving surface which, in the preferred embodiment, is a form of carpeting.

BRIEF DESCRIPTION OF THE DRAWINGS

FIGURE 1 is a side elevational view of the animal climbing structure of this invention;

FIGURE 2 is a top plan view thereof;

FIGURE 3 is a fragmentary sectional view of the top portion of the animal climbing structure shown in FIGURE 1;

FIGURE 4 is a fragmentary sectional view of an intermediate portion of the structure shown in FIGURE 1;

FIGURE 5 is a fragmentary sectional view of the base portion of the structure shown in FIGURE 1; and FIGURE 6 is a section view taken generally along line 6—6 of FIGURE 1.

BRIEF DESCRIPTION OF THE PREFERRED EMBODIMENT

Referring now to the drawings, the portable animal climbing structure or cat climbing appliance 10 of this invention is shown in FIGURE 1 placed in use between a floor 12 and ceiling 14 of a room. Preferably, the structure 10 includes a main upright member or tubular member 16 (see FIGURES 3 through 5) generally circular cylindrical in configuration. One end of the tubular member 16, such as the open bottom 16a, is provided with an interiorly threaded plug 18 secured therein by well known means, such as a suitable adhesive. Plug 18 has a radial flange 18a which abuts the bottom of tube 16 to afford a load bearing surface. A means for changing the effective length of member 16 in the form of a threaded spindle 20 is threadably received within plug 18. Spindle 20 has a radially enlarged disc-like portion 22 to facilitate finger gripping thereof. The terminal end of spindle 20 is provided with a spherical seating surface 24 intended to be matingly received in the spherical recess or seating surface 26 of base plate 28. Base plate 28 has a substantially flat bottom 30 to adapt the same to be received on floor 12.

The other end of tubular member 16, such as the open top 16b, is preferably provided with a plug 34 which includes a first portion 36 snugly, matingly received within tubular member 16 and a second or cap portion 38 being enlarged relative to tubular member 16 and having a substantially flat upper surface 40 to adapt the same to abut against ceiling 14.

The exterior of member 16 is provided with a suitable traction giving animal claw receiving and supporting surface 42. Such a surface may be provided by covering the tubular member 16 with a carpet-like material. In the preferred embodiment, a plastic impregnated felt-like carpeting made by the General Felt Company and sold under the trademark "Four Season Carpeting" is utilized. Also, well known carpets of polypropylene olefin fiber may be used. With such an exterior surface on the tubular member 16, a household pet, such as a cat, may both climb and descend the structure 10 under the control of his claws providing endless hours of enjoyment for the animal.

To assemble the unit, the cap 34 may be inserted into the upper end 16b. The spindle 20 may then be threaded substantially fully into the plug 18 at the lower end 16a and the base 28 juxtaposed against the floor. The spindle 20 is then reversely threaded with the aid of finger manipulation in the area of the disc 22 so that the portion 24 seats in portion 26 of base 28. As the reverse threading of spindle 20 increases the effective length between base 28 and cap 38, suitable means may be utilized to "true" the structure 10 with respect to vertical. Following this, tightening may be completed by continuing the reverse threading of spindle 20 until the structure 10 is snugly and securely in a tensioned condition between floor 12 and ceiling 14.

One such suitable means to be utilized to "true" the structure 10 with respect to vertical is shown in FIGURES 1 and 6. A generally C-shaped member 43 of spring metal or the like, such as coat hanger wire, has a configuration generally concentric with, and slightly undersize relative to, the exterior of the structure 10. Thus, the member 43 may be affixed to the exterior of the structure 10 by spring tension. Outwardly projecting legs 43a are provided with plumb means in the form of strings 43b having weights 43c at the ends thereof. It is intended rangement, the plumb means afforded by the two lines 43b and the associated weights 43c may be utilized for "truing" the structure with respect to two planes.

Structure 10 may be provided with a suitable perching surface or shelf 44 to provide a substantially horizontal surface on which an animal, such as a cat, may perch after having traversed to the structure 10. Preferably, shelf 44 would also be provided with a suitable traction giving surface 46 of a materal similar to that utilized as traction giving surface 42.

The preferred form for providing such a shelf is to form the tubular member 16 of two separate pieces, one substantially longer than the other, or shorter member 16' shown in FIGURE 4. Preferably member 16' is also provided with a traction giving surface 42.

Shelf 44 is provided with a support member connecting portion 47 including a central opening on aperture 48 having an inner diameter generally mating with that of the interior of tubular member 16. A plug 50 is preferably fixed in the tubular member 16 by suitable means, such as by adhesion or the like, and has an exterior closely mating with the interior 48 of shelf 44. Preferably the inner diameters of members 16, 16' and opening 48 are all substantially equal and the outer diameter of plug 50 closely mates therewith. In assembly, the plug 50 is inserted through the opening 48 in shelf 44 and also telescoped into the interior of tubular member 16'. Following this, the remaining assembly steps previously described are completed and the tensioned condition of the assembly securely holds the shelf between the two parts 16 and 16' while the plug 50 holds the shelf against lateral displacement relative to the structure 10 and the abutting surfaces of the tubular members 16 and 16' provide shoulders which hold the shelf against vertical displacement relative thereto. As best seen in FIGURE 2, preferably the connecting portion 47 of the shelf 44 is relatively cantilevered outwardly from the structure 10 permitting a climbing animal to climb beyond the shelf if desired, or to gain easy access to the surface of the shelf after traversing the extent of the structure 10 up to the area on the shelf.

I have found that portion 36 of top plug 34 may be made from the portion cut from the shelf 44 to form the hollow interior 48. Both the top plug structure 34 and base plate structures 28 as well as shelf 44 may be made from wood or plastic as desired. In addition, for economy of construction, the tubular member 16 may be made of a fibrous or cardboard material. Both the materials suggested as well as the structural arrangement of the components and ease of assembly afford an inexpensive and easily installed pet climbing structure suitable for use in the home which will provide many hours of satisfaction and enjoyment for climbing animals such as cats or the like. It is to be understood that tubular unit 16' could be made in different incremental lengths to accommodate ceilings of the different heights, such as 8 foot ceilings and 10 foot ceilings with the minor deviations compensated for by the use of the threaded spindle 20. It is to be further understood that a multiplicity of shorter sections 16 could be utilized to afford a means for mounting a multiplicity of shelf structures 44 so that more than one shelf could be provided on a structure 10.

The foregoing detailed description has been given for clearness of understanding only, and no unnecessary limitations should be understood therefrom, as some modifications may be obvious to those skilled in the art.

I claim:

1. An animal climbing apparatus comprising: an upright support member having a top and bottom and an intermediate portion therebetween; means at the top of the support for engaging a room ceiling; means at the bottom of the support for engaging a room floor; and traction giving animal claw receiving and supporting means attached to and substantially enclosing the intermediate portion of said support.

2. The animal climbing apparatus of claim 1 including means associated with one of the room and floor engaging means for changing the effective length thereof.

3. The animal climbing apparatus of claim 1 wherein the upright support includes a first section and a second section each telescopically joined together with an outwardly extending shelf means at the juncture of said sections.

4. An animal climbing apparatus comprising: a generally tubular support having a top and a bottom; cap means at the top of the support for engagement with a room ceiling; screw adjustment at the bottom of the support for engagement with a room floor; and fibrous traction giving animal claw receiving and supporting means attached to and substantially enclosing the exterior of the support between the top and bottom thereof.

5. The animal climbing apparatus of claim 4 wherein the tubular support comprises two sections telescopically joined together with an outwardly extending shelf means at the juncture of said sections.

6. The climbing structure of claim 5 wherein the shelf means has a perching portion and a support member connecting portion extending outwardly therefrom, with an opening through the support member connecting portion; and wherein one of the tubular support sections has a projection of a size to fit in the said opening in the shelf connecting portion and the interior of the other tubular support section to thereby connect the two sections of the tubular support and the shelf means together.

7. The animal climbing apparatus of claim 6 wherein the sections of the tubular support have hollow interiors of substantially the same inner diameter and wherein the openings in the shelf connecting portion has an inner diameter substantially equal thereto with the projection of the one pole section having an outer diameter generally mating with said inner diameters.

8. The animal climbing apparatus of claim 7 wherein the shelf perching portion is provided with a traction giving surface.

9. The animal climbing apparatus of claim 7 wherein the screw adjustment means includes a base cap with a recess in the upper surface thereof and a threaded member having a base engaging end, the base engaging end being of a size and shape to generally matingly occupy the recess in the base cap.

10. The animal climbing apparatus of claim 9 wherein the screw member has a radially enlarged surface near the base engaging end to provide finger gripping means for actuating the same.

11. The animal climbing apparatus of claim 7 wherein the traction giving means comprises a carpet-like material.

12. The animal climbing apparatus of claim 11 wherein the cap means includes a first portion radially enlarged relative to the tubular support and a second portion having an outer diameter substantially mating with the inner diameter of the tubular support.

References Cited

UNITED STATES PATENTS

| D. 195,412 | 6/1963 | Vernik | D33—3 |
|---|---|---|---|
| 2,887,988 | 5/1959 | Cottongim | 119—51 |
| 2,894,487 | 7/1959 | Goldson | 119—1 |
| 2,970,701 | 2/1961 | Fetter | 211—78 |
| 2,991,040 | 7/1961 | Levy | 248—356 |
| 2,997,019 | 8/1961 | Bryson | 119—1 |
| 3,327,310 | 6/1967 | Bethune et al. | 248—351 X |
| 3,437,060 | 4/1969 | Giambalvo | 108—151 |

ALDRICH F. MEDBERY, Primary Examiner

U.S. Cl. X.R.

D30—42;  D33—3;  D80—9;  108—151;  119—29; 248—356